United States Patent
Takakuwa et al.

(12) 
(10) Patent No.: US 6,621,682 B1
(45) Date of Patent: Sep. 16, 2003

(54) LAMINATED ELECTRONIC PART HAVING INTERNAL CONDUCTING REGION CONNECTED TO AN EXTERNAL CONTACT AND MANUFACTURING METHOD THEREOF

(75) Inventors: Satoshi Takakuwa, Tokyo (JP); Hiroya Shigemoto, Tokyo (JP); Yukio Ono, Tokyo (JP)

(73) Assignee: Taiyo Yuden Co., Ltd., Tokyo (JP)

(*) Notice: Subject to any disclaimer, the term of this patent is extended or adjusted under 35 U.S.C. 154(b) by 358 days.

(21) Appl. No.: 09/624,770

(22) Filed: Jul. 25, 2000

Related U.S. Application Data

(63) Continuation of application No. 09/010,833, filed on Jan. 22, 1998.

(30) Foreign Application Priority Data

Jan. 22, 1997 (JP) .............................................. H9-9675

(51) Int. Cl.⁷ .............................................. H01G 4/228
(52) U.S. Cl. .................. 361/306.3; 361/306.1
(58) Field of Search .................. 361/306.1, 306.3, 361/303, 309, 321.2, 321.3

(56) References Cited

U.S. PATENT DOCUMENTS

| | | |
|---|---|---|
| 4,232,059 A | 11/1980 | Proffitt |
| 4,346,537 A | 8/1982 | Masujima et al. |
| 4,685,197 A | 8/1987 | Tigelaar et al. |
| 4,687,540 A | 8/1987 | Singhdeo et al. |
| 4,752,856 A | 6/1988 | Rayburn |
| 4,797,780 A | 1/1989 | Moser et al. |
| 4,896,464 A | 1/1990 | Kim et al. |
| 4,910,638 A | 3/1990 | Berghout et al. |
| 5,334,411 A | 8/1994 | Pepin |
| 5,335,139 A | 8/1994 | Nomura et al. |
| 5,597,494 A | 1/1997 | Kohno et al. |

*Primary Examiner*—Anthony Dinkins
(74) *Attorney, Agent, or Firm*—Lowe Hauptman Gilman & Berner, LLP

(57) ABSTRACT

An electronic part is made from a laminated object including stacked abutting ceramic green sheets each carrying an electrically conductive paste having a contact portion in proximity to an edge of the sheet. The laminated object is fired to form a laminated body including ceramic insulator layers abutting electrically conductive internal electrode layers including contact segments in proximity to a side of the object. The body is then processed so the contact segments are exposed on the side of the object. Then an external electrode is formed on the polished body where the contact segment is exposed by using a dry process so the external electrode and the contact segment abut to establish an electric contact between the external electrode and the contact segments. The firing step causes the paste to move relative to the edges of the sheets so the contact segments are displaced relative to the edges of the sheets. The processing step results in a reduction of the displacement of the contact segments relative to the edges of the sheets so the contact segments are displaced relative to the edges of the sheets by a distance to provide an anchoring effect for the external electrode when it is formed by the dry process.

12 Claims, 16 Drawing Sheets

US 6,621,682 B1

LAMINATED ELECTRONIC PART HAVING INTERNAL CONDUCTING REGION CONNECTED TO AN EXTERNAL CONTACT AND MANUFACTURING METHOD THEREOF

This application is a Continuation application Ser. No. 09/010,833 filed Jan. 22, 1998.

BACKGROUND OF THE INVENTION

1. Field of the Invention

The present invention relates to an electronic part such as a laminated ceramic capacitor and a manufacturing method thereof.

2. Description of the Prior Art

A laminated ceramic capacitor, which is an example of laminated electronic part, is known as a chip-like electronic part. This laminated capacitor consists of a laminated body, which has a rectangular parallelepiped form and is composed of alternately laminated electrically conductive internal electrode layers and ceramic insulator layers, and external electrodes which are conductively connected to the internal electrodes and are formed at both ends of the laminated body.

For manufacturing this laminated ceramic capacitor, a method described below is known:

First, an electrically conductive paste, which forms the internal electrodes, is applied to ceramic green sheets composed of a dielectric ceramic material in a predetermined pattern. Ag, Pd, Ag—Pd, Ni or Cu, for example, is used as the electrically conductive paste.

Then, a sheet laminated body is formed by stacking a plurality of the ceramic green sheets. Thereafter, this sheet laminated body as a whole is bonded under pressure. Further, a laminated chip, which has a rectangular parallelepiped form, is obtained by cutting the sheet laminated body in predetermined width and length. The sheet laminated body is cut so that the internal electrodes are exposed on cut surfaces.

Then, the laminated chip is heated to approximately 300° C. in atmosphere for de-binding treatment, to vaporize an organic binder component contained on the laminated chip. Thereafter, a laminated body, which is made of a ceramic material, is obtained by firing the laminated chip at approximately 1300° C. in atmosphere.

Finally, external electrodes, which are conductively connected to the internal electrodes, are formed at both the ends of the laminated body. The external electrodes are formed by a dry process, which is typically represented by the vacuum deposition and sputtering. Thin films of metal such as Ag, Sn, Cr or Ni are formed at both ends of the laminated body by this process. The dry process is selected for the purpose mainly of forming the external electrodes into thin films, thereby preventing the laminated body from being cracked or delaminated due to stress, etc. applied by the external electrodes.

In such a manufacturing method, when firing the laminated body, an oxide film may be formed or various contaminants may adhere onto surfaces of the internal electrodes which are exposed to surfaces of the laminated body. Further, internal electrodes may protrude or are depressed from the surfaces of the laminated body since the electrically conductive paste and the ceramic green sheets have different shrinkage coefficients.

Accordingly, an adhesion property is degraded between the external electrodes and the internal electrodes, thereby making the external electrodes liable to peel off. Further, the oxide film degrades electrical conductivity between the external electrodes and the internal electrodes. Furthermore, the external electrodes with thin film thickness have low step coverage and are liable to crack. Cracks allow moisture contained in atmosphere to penetrate into the electronic part, and lower its water resistance, reliability and so on.

SUMMARY OF THE INVENTION

The present invention has been achieved in view of the circumstances described above, and has a primary object to provide an electronic part with high precision, and is excellent in durability, water resistance and reliability as well as a manufacturing method thereof by enhancing an adhesion property between the internal electronic part and the external electronic part.

A second object of the present invention is to provide an electronic part which substantially prevents external electrodes from peeling off a main body of the electronic part, thereby being excellent in durability, water resistance and reliability as well as a manufacturing method thereof.

For accomplishing the primary object, the electronic part according to the present invention is configured as an electronic part including a laminated body which comprises electrically conductive internal electrode layers and ceramic insulator layers, and external electrodes composed of thin films which are formed by a dry process at predetermined locations of surfaces of said laminated body including locations where said internal electrodes are exposed and which are conductively connected to said internal electrode layers, and characterized in that at least said predetermined locations of the surface of said laminated body have a predetermined surface roughness.

This electronic part is capable of preventing the external electrodes from peeling off the laminated body owing to an anchor effect since the surfaces of the laminated body have the predetermined surface roughness. Further, the electronic part enhances a step coverage of the external electrodes.

In a preferable embodiment of the present invention, the step coverage is further enhanced by limiting a protruding height of the internal electrodes from the surface of the laminated body within a predetermined value. Similarly, the step coverage is enhanced by limiting a depression depth of the internal electrodes from the surface of the laminated body within a predetermined value.

Furthermore, the manufacturing method of the electronic part described above according to the present invention comprises forming (1) a laminated body including electrically conductive internal electrode layers and ceramic insulator layers by firing a laminated object composed of an electrically conductive paste and ceramic green sheets, and (2) external electrodes composed of thin films conductively connected to said internal electrodes at locations of surfaces of said laminated body including locations where said internal electrodes are exposed, and is characterized mainly in that the method comprises at least the predetermined locations of the surfaces of said laminated body are polished after the the laminated body is formed.

This manufacturing method of the electronic part makes it possible to prevent the external electrodes from peeling off the laminated body under an anchor effect since a predetermined surface roughness is obtained on the surfaces of the laminated body during the polishing step. Furthermore, the polishing step eliminates an oxide film and contaminant since surfaces of the internal electrodes, which are exposed on the surfaces of the laminated body are cut during the polishing. Accordingly, the manufacturing method enhances an adhesion property between the internal electrodes and the external electrodes.

In a preferable embodiment wherein a protruding height of said internal electrodes from the surfaces of said laminated body is limited within a predetermined value at the polishing step, a step coverage is further enhanced. The step coverage is further enhanced by limiting a depression depth of said internal electrodes from the surface of said laminated body within a predetermined value.

For accomplishing the primary object described above, the manufacturing method according to the present invention comprises a step to form a laminated body which comprises electrically conductive internal electrode layers and ceramic insulator layers by firing a laminated object composed of an electrically conductive paste and ceramic green sheets, and a step to form external electrodes composed of thin films which are conductively connected to said internal electrodes by a dry process at predetermined locations of surfaces of said laminated body including at least locations where said internal electrodes are exposed, and is characterized mainly in that the method comprises a step to form electrically conductive intermediate layers at least on the predetermined locations of the surfaces of said laminated body after the step to form said laminated body.

Owing to the intermediate layers, this manufacturing method enhances an adhesion property between the external electrodes and the laminated body even when the internal electrodes protrude or depress from the surfaces of the laminated body, and moderates stress applied by the external electrodes.

In a preferable embodiment of the present invention, the adhesion property between the internal electrodes and the external electrodes can be enhanced by configuring the intermediate layer formation step so as to comprise a step to apply a suspension containing a dispersed metal to the predetermined locations, a step to fuse the metal by heating the locations where the suspension is applied and a step to harden the metal by stopping the heating.

For accomplishing the primary object described above, the electronic part according to the present invention comprises a laminated body which comprises electrically conductive internal electrode layers and ceramic insulator layers, and external electrodes composed of thin films which are formed by a dry process at predetermined locations of surfaces of said laminated body including locations where said internal electrodes are exposed and which are conductively connected to said internal electrodes, and is characterized in that said external electrodes are made of a material which has a fusion point higher than that of said internal electrodes.

Further, the manufacturing method of the electronic part described above according to the present invention comprises a step to form a laminated body which comprises electrically inductive internal electrode layers and ceramic insulator layers by firing the laminated object composed of an electrically conductive paste and ceramic green sheets, and a step to form external electrodes composed of thin films conductively connected to said internal electrodes by a dry process at predetermined locations of the surfaces of said laminated body including at least locations where said internal electrodes are exposed, and is characterized in that said external electrodes are made of a material which has a fusion point higher than that of said internal electrodes.

This manufacturing method allows oxide films formed on surfaces of the internal electrodes to be decomposed since the surfaces of the internal electrodes which are exposed to the surfaces of the laminated body are fused at the step to form the external electrodes by the dry process. Accordingly, this method is capable of enhancing an adhesion property between the external electrodes and the internal electrodes.

For accomplishing the primary object, the electronic part according-to the present invention consists of a laminated body which comprises electrically conductive internal electrode layers and ceramic insulator layers, and external electrodes composed of thin films which are formed by a dry process at predetermined locations of surfaces of said laminated body including locations where said internal electrodes are exposed and which are conductively connected to said internal electrodes, and is characterized in said external electrodes are formed so as to have film thickness thicker than that of other locations at the locations where said internal electrodes are exposed.

A manufacturing method of the electronic part described above according to the present invention comprises a step to form a laminated body which comprises electrically conductive internal electrode layers and ceramic insulator layers by firing a laminated object composed of an electrically conductive paste and ceramic green sheets, and a step to form external electrodes composed of thin films conductively connected to said internal electrodes by a dry process at locations of surfaces of said laminated body including at least locations of the surface of said laminated body where said internal electrodes are exposed, and is characterized in that said external electrodes are formed so as to have film thickness thicker than that of other locations at the locations where said internal electrodes are exposed.

This manufacturing method enhances a step coverage of the external electrodes, thereby improving an adhesion property between the external electrodes and the internal electrodes even when the internal electrodes protrude from the surfaces of the laminated body by firing the laminated object.

In a preferable embodiment of the present invention, said external electrodes are formed by a dry process with a mask which has apertures formed at locations corresponding to the predetermined locations of the surfaces of the laminated body and film formation retarder members for reducing a film forming rate in the apertures. This method makes it possible to manufacture electronic parts, which have a high adhesion property between external electrodes and internal electrodes as described above.

For accomplishing the second object, the electronic part according to the present invention comprises a unit element which has nearly a rectangular parallelopiped form, and external electrodes which are formed at predetermined locations ranging from a first surface where said internal electrodes are exposed to second surfaces adjacent to said first surface, and is characterized mainly in that said external electrodes have film thickness which increases from ends of said external electrodes on said second surfaces toward said first surface, and a surface of the end of said external electrode on said second surface intersects with said second surface at an angle not larger than a predetermined angle.

The electronic part according to the present invention wherein the external electrodes have a film thickness on the second surface which is smaller than that on the first surface moderates a stress applied to the unit element at a stage to solder this electronic part onto a circuit board, thereby being capable of preventing the unit element from being cracked. Further, this electronic part is capable of preventing the external electrodes from peeling off the unit element since the external electrodes are configured so as to be thinner toward its ends on the second surface.

The manufacturing method of the electronic part described above according to the present invention comprises a step to form a unit element which comprises internal electrodes and has a nearly rectangular parallelopiped form, a step to form external electrodes at predetermined locations ranging from a first surface where said internal electrodes are exposed to second surfaces adjacent to said first surface of said unit element by irradiating with particles of a film forming material by a dry process, and is characterized mainly in that a film forming rate at said predetermined locations on said second surfaces is adjusted using a mask equipped with a film formation adjusting member which shadows portions of said predetermined locations of said second surfaces from the irradiation of the particles of said film forming material.

This manufacturing method deposits the film forming particles onto the second surface of the unit element while diffusing across the film formation adjusting members. Accordingly, the external electrodes are formed so as to have film thickness on the second surface, which is gradually increased from their ends. As a result, an electronic part manufactured by the method according to the present invention has a unit element which can hardly be cracked and external electrodes which can hardly peel off.

Other objects, configurations and effects of the present invention will be apparent from the following detailed description of the invention.

DESCRIPTION OF THE PREFERRED EMBODIMENTS

Figure 1:
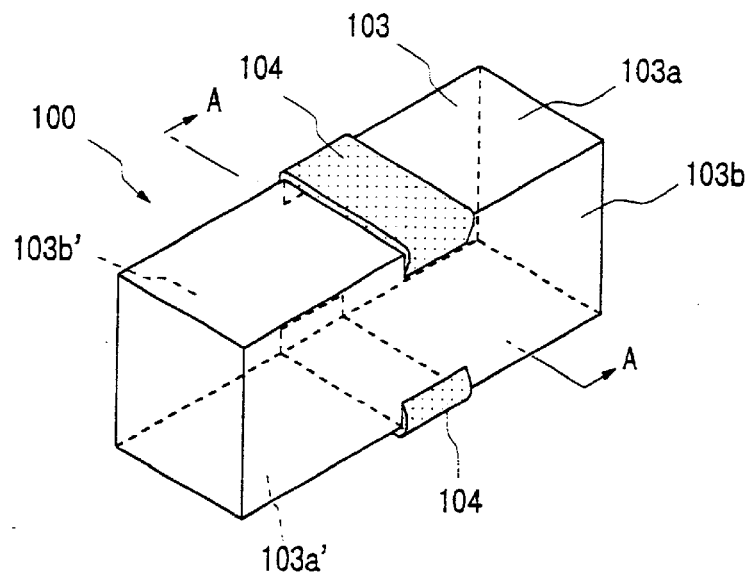
FIG. 1 is a perspective view of a laminated capacitor.
Figure 2:
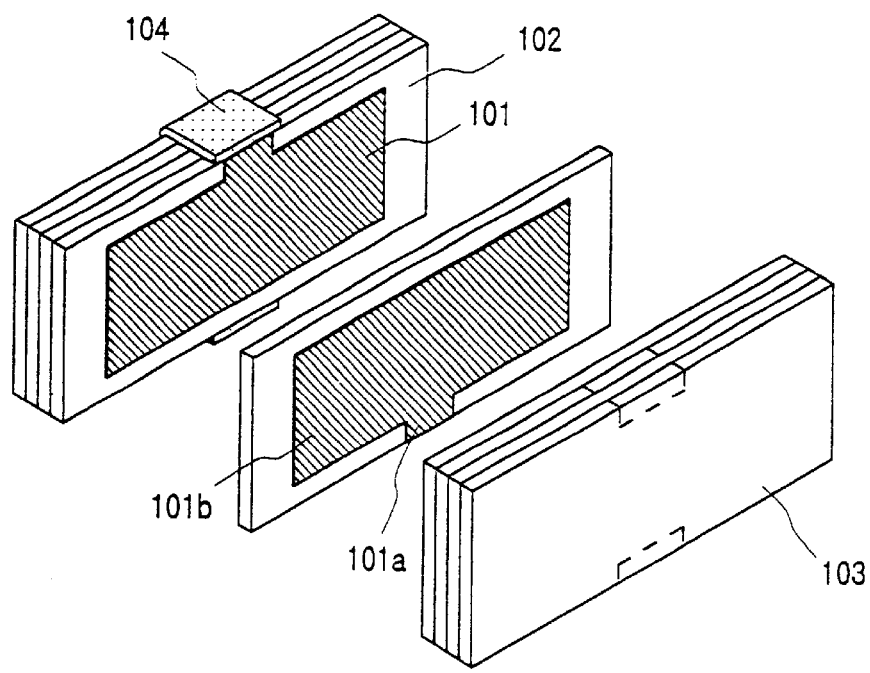
FIG. 2 is a perspective view illustrating the laminated capacitor shown in FIG. 1 in its disassembled condition.
Figure 3:
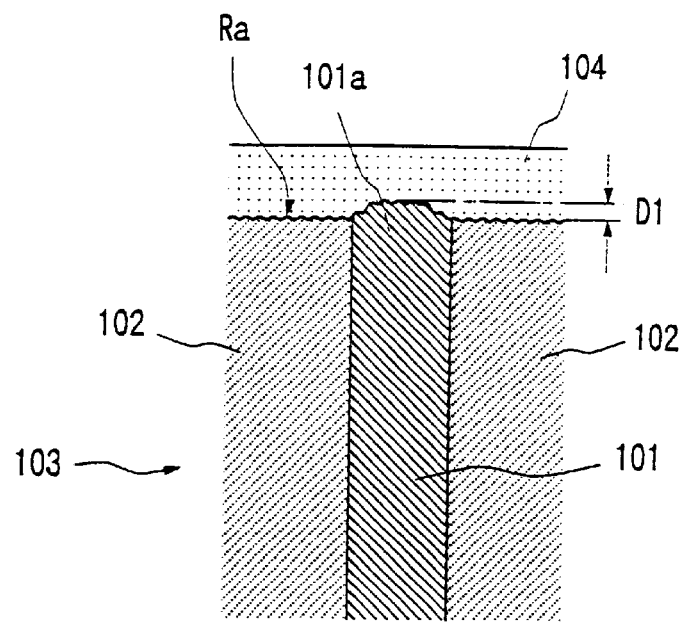
FIGS. 3 and 4 are sectional views of the laminated capacitor shown in FIG. 1 taken in a direction indicated by A arrows.
Figure 4:
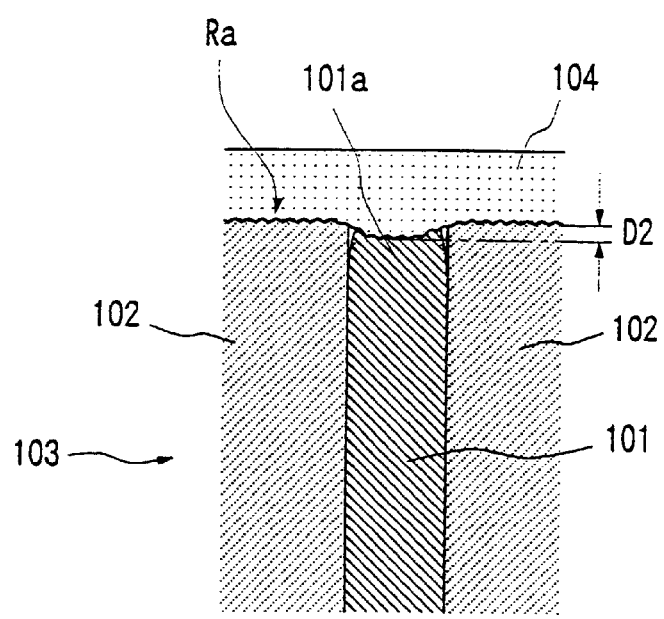

A first embodiment of the present invention will be described with reference to FIGS. 1 through 4. A laminated capacitor will be described as an example of laminated electronic part in the first embodiment. FIG. 1 is a perspective view of a laminated capacitor preferred as the first embodiment, FIG. 2 is a perspective view illustrating the laminated capacitor shown in FIG. 1 in its disassembled condition, and FIGS. 3 and 4 are sectional views taken in a direction indicated by arrows A for illustrating locations at which external electrodes of the laminated capacitor are formed.

In FIG. 1 laminated capacitor 100 is an example of a laminated electronic part having a laminated body 103 including alternately laminated internal electrodes 101 and insulator layers 102, and a pair of external electrodes 104 which are attached to the laminated body 103.

The internal electrode 101 is a thin metal film which is prepared by sintering a thin film of electrically conductive paste. It is made of a material having a main component, for example, of Ag, Pd or Ag—Pd. Further, the internal electrode 101 includes an internal electrode outlet portion 101a and an internal electrode piece 101b which is connected to a base of the internal electrode outlet portion 101a. An exposed end of the internal electrode outlet portion 101a is conductively connected to the external electrode 104.

The insulator layer 102 is composed of a rectangular sheet-like ceramic sinter. This ceramic sinter is made of a dielectric material which is prepared by firing a green sheet having a main component, for example, of barium titanate.

The external electrode 104 is a thin metal film which is made of Ni, Ag, Sn, Cr, Al, Cu or an alloy thereof. The external electrode 104 is formed by a dry process, typically vacuum deposition or sputtering. The external electrode 104 is formed so it has a predetermined width on a central portion of side surface 103a of the laminated body 103 and so it extends onto portions of side surfaces 103b and 103b' which intersect side surface 103a. Similarly the external electrode predetermined width from a side surface 103a of the laminated body 103 to side surfaces 103b and 103b' which are adjacent to the side surface 103a. Similarly, the external electrode 104' is formed on a side surface 103a' which is opposed to the side surface 103a; electrode 104' also extends onto portions of side surfaces 103b and 103b'.

The side surfaces 103a, 103a', 103b and 103b' of the laminated body 103 have slight concavities and convexities as shown in FIGS. 3 and 4 which are formed by polishing described later. Surface roughness of surfaces 103 is approximately 0.1 μm or lower in terms of an arithmetical mean roughness Ra. Due to a difference between shrinkage coefficients of the internal electrode 101 and the insulator layer 102, the internal electrode outlet portion 101a may protrude from the laminated body 103 at the firing stage, as illustrated in FIG. 3. However, the internal electrode outlet portion 101a is polished as described later so as to have a gentle convex shape as shown in FIG. 3 and has a protruding length D1 not exceeding approximately 0.5 μm. Similarly, the internal electrode 101 may contract and form a depression in the laminated body 103 as shown in FIG. 4. In such a case, however, the depression is made gentle by the polishing described later and its depth D2 does not exceed approximately 0.5 μm.

This laminated capacitor 100 has an enhanced electrical conductivity between the external electrode 104 and the internal electrode 101 since an oxide film formed on the internal electrode outlet portion 101a at the firing stage of the laminated body is eliminated by the polishing described later. Further, an adhesion property between the laminated body 103 and the external electrode 104 is enhanced owing to an anchor effect produced by the concavities and convexities formed on the surface of the side surfaces 103a, 103a', 103b and 103b' of the laminated body 103. Furthermore, a step coverage property is enhanced since the protruding length D1 of the internal electrode outlet portion 101a or the depth of the depression D2 formed by shrinkage of the internal electrode outlet portion 101a is less than a predetermined value. In other words, the external electrode 104 is provided with a film thickness by flattening the portion of the laminated body 103 where the external electrode 104 is to be formed. Accordingly, electrical conductivity is enhanced between the external electrode 104 and the internal electrode 101. Moreover, the laminated capacitor 100 is capable of preventing the external electrode 104 from being cracked. Accordingly, the laminated capacitor 100 ensures a high adhesion property between the external electrode 104 and the laminated body 103, and is excellent in its precision, durability, water resistance and reliability.

Now, the method of manufacturing laminated capacitor 100 is described below with reference to FIGS. 5 through 10. First, an electrically conductive paste having a main component of Ag, Pd or Ag—Pd is printed onto green sheets and dried. The electrically conductive paste is printed in a pattern of the internal electrode 101. Then, a plurality of the green sheets are laminated. Further, a laminated body thus obtained is bonded at a temperature of approximately 50° C. while applying a pressure of approximately 40 tons in a direction of its thickness. Thereafter, a laminated chip is obtained by cutting the laminated body into a lattice-like form.

Then, the laminated chip is heated to approximately 300° C. in atmosphere. This heating is a de-binder treatment which vaporizes an organic binder contained in the green sheets. Thereafter, a laminated body 103 which has a nearly rectangular parallelepiped form is obtained by firing the laminated chip at a temperature of approximately 1300° C.

Then, the laminated body 103 is polished by the sand blast method using part holding tools 110a and 110b. Each of the part holding tools 110a and 110b is made of an elastic material (for example, rubber) in which holding grooves 111 are formed in parallel with each other. The holding groove 111 has a length which is sufficient for holding at least one laminated body 103. The holding groove 111 has a width which is slightly narrower than a width of the side surface 103a of the laminated body 103. The holding groove 111 has a depth equal to ½ of a height of the side surface 103b' of the laminated body 103.

Figure 5:
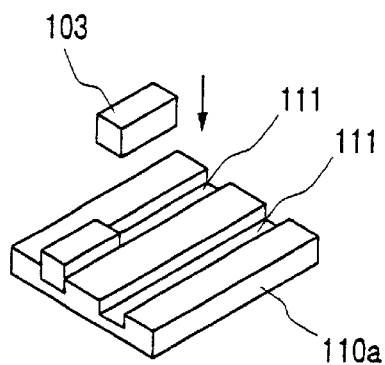
FIGS. 5 through 10 are diagrams descriptive of 5 manufacturing steps for the laminated capacitor shown in FIG. 1.
Figure 6:
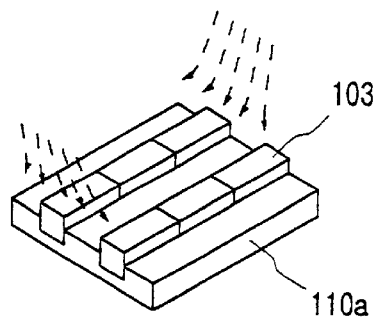
Figure 7:
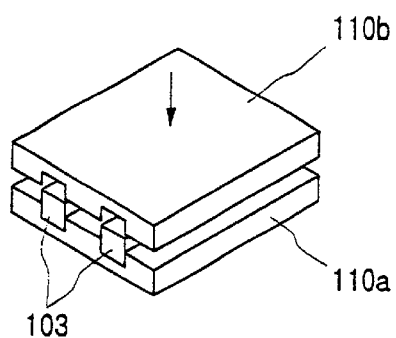
Figure 8:
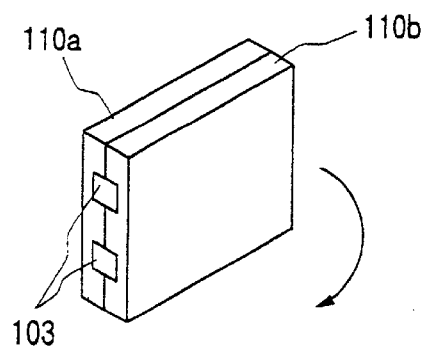
Figure 9:
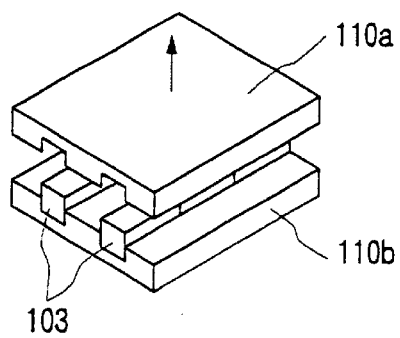
Figure 10:
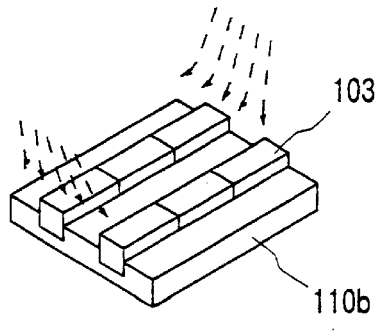

The laminated body 103 is polished as described below. First, the laminated body 103 is fitted into the holding groove 111 of the first part holding tool 110a as shown in FIG. 5. Then, areas of the laminated body 103 which are exposed from the first part holding tool 110a as shown in FIG. 6, i.e., the side surface 103a as a whole as well as upper halves of the side surfaces 103b and 103b', are polished by the sand blast method. The sand blast method is a polishing method which blasts Alundum (an abrasive material) with compressed air at 2 kg/cm² for several minutes. Then, the second part holding tool 110b is overlapped with the first part holding tool 110a so that the laminated body 103 which is disposed in the first part holding tool 110a is fitted into the holding groove 111 of the second holding tool 110b as shown in FIG. 7. Then, the laminated body 103, and the part holding tools 110a and 110b are set upside down as shown in FIG. 8. Then, the first part holding tool 110a is removed so that the laminated body 103 is held by the part holding tool 110b only. Finally, surfaces which are exposed from the second part holding tool 110b and have not been polished are polished by the sand blast method.

Thereafter, a pair of external electrodes 104 are formed on a polished laminated body 103 by the dry process, typically by vacuum deposition or sputtering. The external electrodes 104 are thin metal films made of a metal such as Ni, Ag, Sn, Cr, Al, Cu or an alloy thereof.

To form the external electrodes 104 by the vacuum deposition process, the laminated body 103 is mounted on a film forming jig 130 (FIG. 11) and the film forming jig 130 is set in a film forming apparatus such as a vacuum chamber. In this film forming apparatus, the metal forming electrodes 104 is heated to a high temperature and vaporized, particles of the metal are deposited onto the exposed surface of laminated body 103 in film forming jig 130. Accordingly, the external electrodes 104 composed of thin metal films are formed on the laminated body 103.

Figure 11:
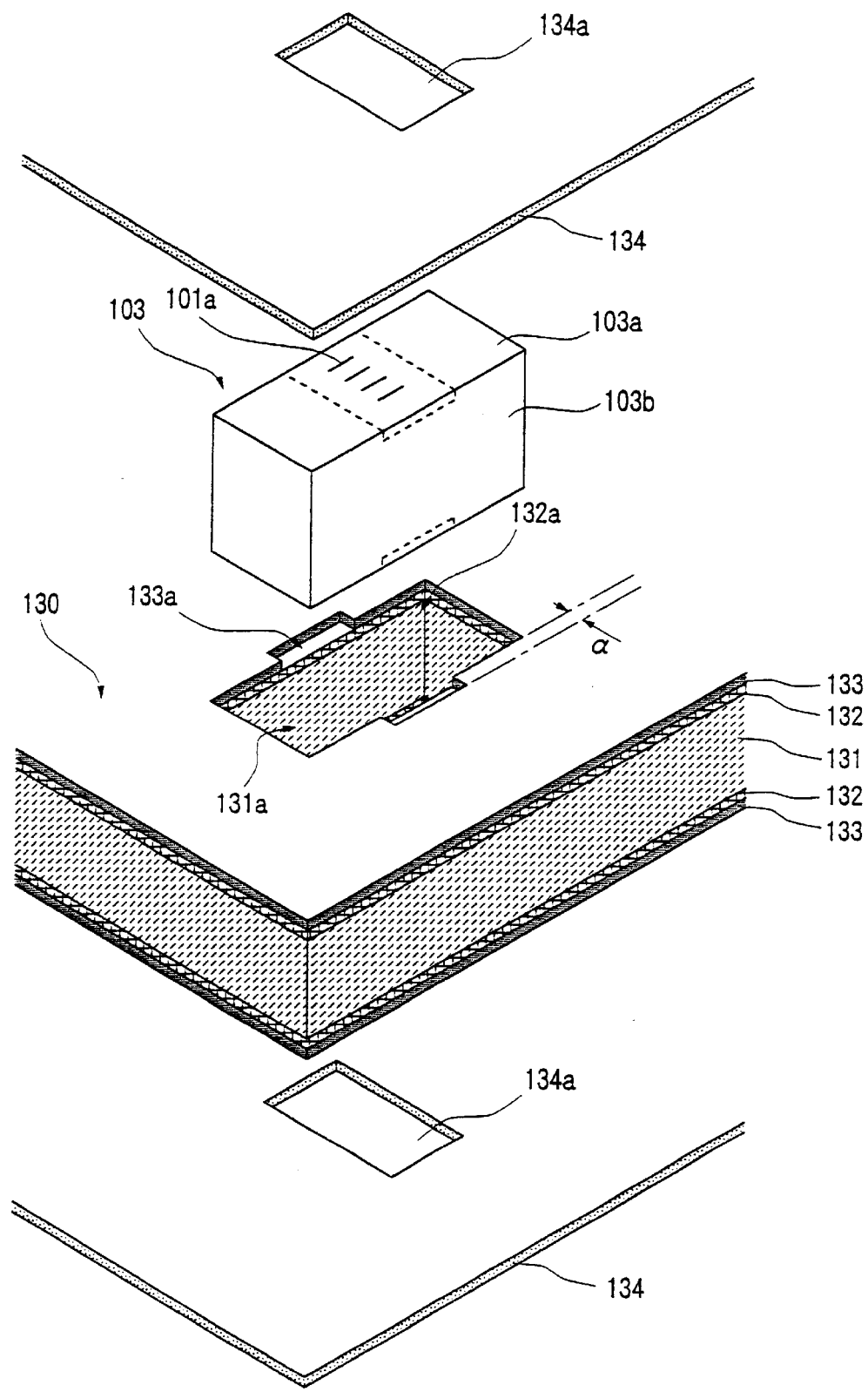
FIG. 11 is a perspective view illustrating a configuration of a film forming jig in its disassembled condition;.

The film forming jig 130 is composed of a holding cage 131 and masks 132 through 134 as shown in FIG. 11. The film forming jig 130 is composed by stacking the members in a direction of its thickness, and is composed of the holding cage 131 which is disposed at a center, and the masks 132, 133 and 134 which are laminated outward in this order over and under the holding cage 131. An aperture is formed in each member of the film forming jig 130 so that the laminated body 103 can be mounted in the film forming jig 130. An aperture 131a having a width and a length which are slightly larger than those of the laminated body 103 is formed in the holding cage 131. An aperture 132a having a width and a length which are slightly smaller than those of the aperture 131a of the holding cage 131 is formed in the mask 132 adjacent to the holding cage 131. An aperture 133a corresponding to the aperture 132a of the mask 132 is formed in the mask 133 adjacent to the mask 132. The aperture 133a is nearly cross-shaped since it protrudes at centers of its sides for a length of α in a width direction of side surface 103a. This pair of protruding portions has a width which is the same as a width of the external electrode 104 to be formed on the side surface 103a of the laminated body 103. The mask 134 which is adjacent to the mask 133 and disposed outermost side has an aperture 134a which has ends corresponding to the protruding portions of the aperture 133a of the mask 133 and is open so as to cover the pair of apertures 133a. Thicknesses of these members are set so that a thickness of the masks 132, masks 133 and the holding cage 131 which are overlapped with one another is the same as a height of the side surface 103b of the laminated body 103. This film forming jig 130 exposes only the locations of the sides of the laminated body 103 at which the external electrodes 104 are to be formed, by overlapping the masks 132, masks 133 and holding cage 131 are with one another, setting the laminated body 103 in the apertures formed in these members, and further overlapping the mask 134. Though it is general to select a metal such as stainless steel, tungsten or molybdenum as a material for the film forming jig 430, it is preferable to use a ceramic material having a small expansion coefficient considering a fact that thermal expansion caused by a high temperature at the stage of irradiation with particles of a film forming.

The laminated capacitor 100 which is one of laminated electronic parts is manufactured by the method described above. This laminated capacitor 100 has enhanced electrical conductivity between the external electrodes 104 and the internal electrode 101 since an oxide film formed on the internal electrode outlet portion 101a at the firing stage of the laminated body is removed by the polishing. Further, the laminated capacitor 100 has an enhanced adhesion property between the laminated body 103 and the external electrodes 104 owing to the anchor effect produced by the concavities and convexities on the side surfaces 103a, 103a', 103b and 103b, of the laminated body 103.

Furthermore, the laminated capacitor 100 has an enhanced step coverage owing to the fact that the protruding length D1 of the internal electrode outlet portion 101a or the depth D2 of the depression formed due to shrinkage of the internal electrode 101 does not exceed the predetermined value. In other words, the external electrodes 104 have a uniform film thickness which is because the locations of the laminated body 103 where the external electrodes. 104 are to be formed are flattened. Accordingly, electrical conductivity is enhanced between the external electrodes 104 and the internal electrodes 101. Moreover, the laminated capacitor 100 is capable of preventing the external electrodes 104 from being cracked. Accordingly, the laminated capacitor 100 has a high adhesion property between the external electrodes 104 and the laminated body 103, and is excellent in its precision, durability, water resistance and reliability.

Though the part holding jigs 110a and 110b are used at the polishing stage by the sand blast method in the first embodiment, it is possible to employ at this stage the film forming jig 130 which is used for forming the external electrodes 104. In such a case, it is preferable to coat a surface of the mask 134 which is the outermost layer of the film forming jig 130 for protecting it from shocks caused by blasting the abrasive material. For coating this surface, it is suitable, for example, to bond a silicone rubber sheet 1 mm thick to the mask 134. For polishing by the sand blast method, an abrasive material and destructions and polishing time which are similar to those described above are adopted. The sand blast method makes it possible to blast the abrasive material only to the locations at which the external electrodes are formed without blasting the abrasive material to other locations. The manufacturing method therefore makes it possible to prevent destruction and moderate shocks due to the blasting of the abrasive material and variations of characteristics of laminated electronic parts. Further, the method makes it possible to manufacture laminated electronic parts efficiently at a small number of steps since it uses the same mask at the polishing stage by the sand blast method and the stage to form the external electrodes by the dry process.

Though the sand blast method is exemplified for polishing the laminated body 103 in the first embodiment, methods which are described below may be adopted instead. That is, the surfaces of the laminated body 103 can be treated, as if they are polished, by submerging the laminated body 103 in dilute hydrochloric acid at several percent for approximately one hour. Further, the laminated body 103 may be subjected to barrel polishing for approximately 10 minutes using zirconia medium having a particle size on the order of 0.5 mm.

Figure 12:
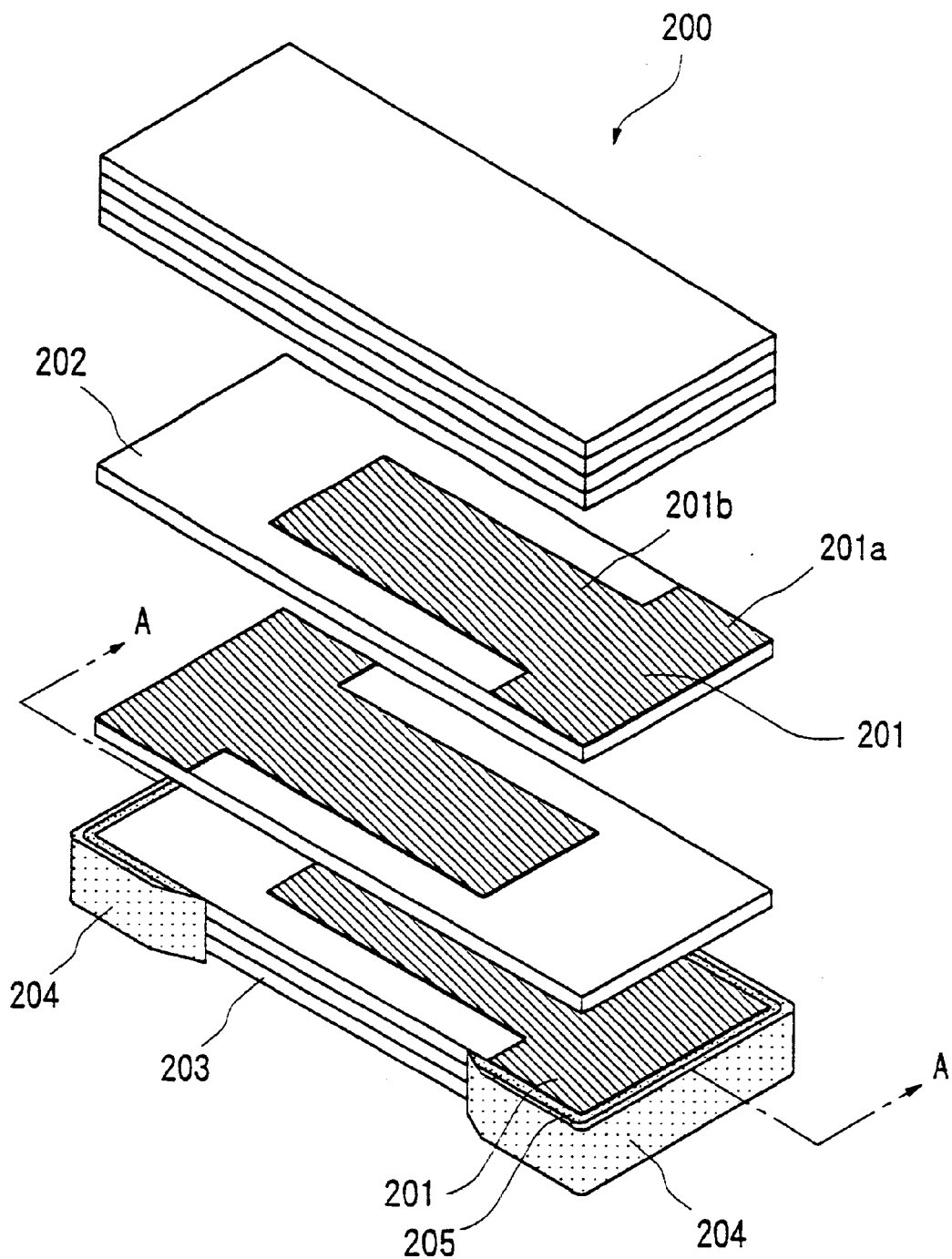
FIG. 12 is a perspective view illustrating another embodiment of a laminated capacitor preferred as another embodiment of the present invention in its disassembled condition.
Figure 13:
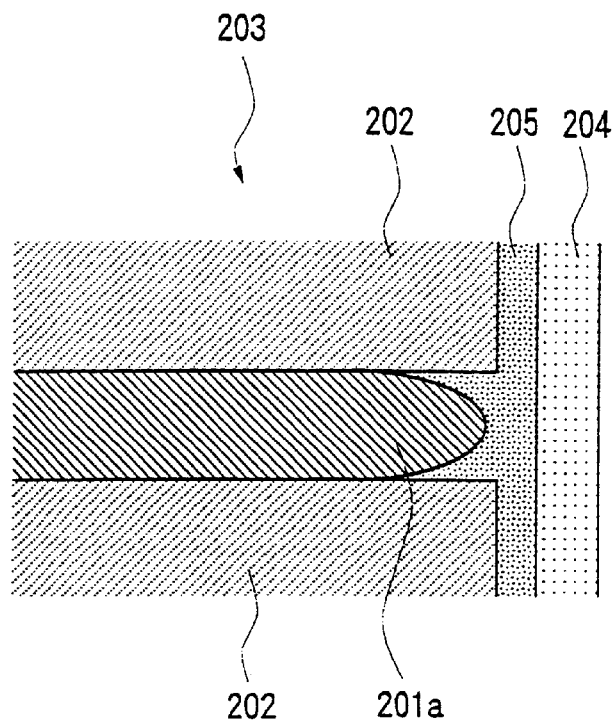
FIG. 13 is a sectional view taken along a direction indicated by arrows A in FIG. 12 for illustrating a connector portion between an internal electrode and an external electrode on an enlarged scale.

Then, a second embodiment of the present invention will be described with reference to FIGS. 12 and 13. A laminated capacitor will be described as an example of laminated electronic part. FIG. 12 is a perspective view illustrating a configuration of a laminated capacitor in its disassembled condition and FIG. 13 is a sectional view taken in a direction indicated by arrows A in FIG. 12 for illustrating a connected portions of an internal electrode and an external electrode.

In FIG. 12, a reference numeral 200 represents a laminated capacitor selected as one example of laminated electronic part consisting of a laminated body 203 which is composed by alternately laminating internal electrodes 201 and insulator layers 202, a pair of external electrodes 204 which alternately connect the internal electrodes 201 in parallel at both ends of the laminated body 203, and intermediate layers 205 which are formed between the laminated body 203 and the external electrodes 204.

The internal electrode 201 is a thin metal film which is formed by sintering a thin film of an electrically conductive paste. Its material has a main component, for example, of Ag, Pd or Ag—Pd. Further, the internal electrode 201 is composed of an internal electrode outlet portion 201a and an internal electrode piece 201b which has a base connected to the internal electrode outlet portion 201a. The internal electrode piece 201b is rectangular and has longer sides nearly perpendicular to the external electrode 204. The internal electrode pieces 201b are formed so as to have the same width on the internal electrodes 201. Furthermore, the internal electrode outlet portion 201a is formed slightly inside an end surface of the laminated body 203 as shown in FIG. 13 since the internal electrode 201 shrinks at a higher ratio than the insulator layer 202 at a stage to fire the laminated body 203.

The insulator layer 202 is composed of a sheet-like ceramic sinter. This ceramic sinter is made of a dielectric material prepared by firing a green sheet having a main component, for example, of barium titanate.

The intermediate layers 205 are disposed at both ends of the laminated body 203, and formed over end surfaces and side surfaces of the laminated body 203. Further, the intermediate layers 205 fill up depressions of the laminated body 203 which are formed due to the fact that the internal electrode outlet portions 201a are formed inside the end surfaces of the laminated body 203. Furthermore, the intermediate layers 205 are formed so as to have flat surfaces which are to be joined with the external electrodes 204. The intermediate layers 205 are made of a metal such as Ag, Sn, Cr, Al, Ni or Cu.

The external electrodes 204 are formed at both the ends of the laminated body 203 and cover the intermediate layers 205. The external electrodes 204 are thin metal films made of Ni, Ag, Sn, Cr, Al, Cu or an alloy thereof. The external electrodes 204 are formed by a dry process which is typically represented by the vacuum deposition and sputtering. The external electrodes 204 are conductively connected to the internal electrodes 201 by way of the intermediate layers 205.

Figure 14:
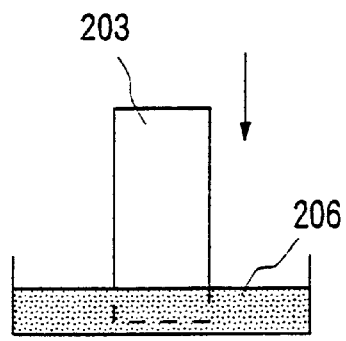
FIGS. 14 and 15 are sectional views descriptive of manufacturing steps for the laminated capacitor shown in FIG. 13.
Figure 15:
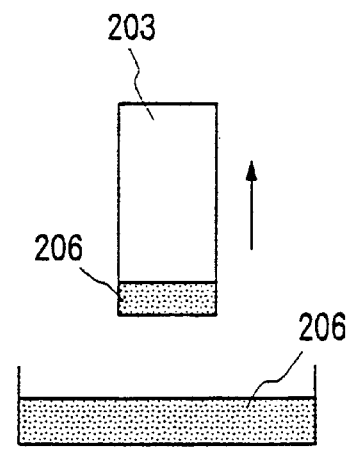

Now, a manufacturing method of the laminated capacitor 200 will be described with reference to FIGS. 14 and 15. FIGS. 14 and 15 are diagrams descriptive of manufacturing steps of the laminated electronic part.

First, laminated body 203 is effected by a de-binder treatment and is sintered. Manufacturing steps to this stage are the same as those in the first embodiment and will not be described in particular.

Then, each end of the laminated body 203 is immersed into a suspension 206 as shown in FIG. 14 and then is pulled up from the suspension 206 as shown in FIG. 15. Ultrafine metal powder consisting of Ag, Sn, Cr. Al, Ni, Cu, etc. is dispersed in the suspension 206. Ultrafine metal particles are metal particles having a particle size not exceeding 0.1 $\mu$m. The end surfaces of the laminated body 203 are covered with the suspension 206 at this step and dried for forming the intermediate layers 205. The intermediate layers 205 may be formed by repeating this step several times.

Finally, the external electrodes 204 are formed as a pair of thin metal films by depositing a metal such as Ag, Sn, Cr, Al, Ni, Cu or an alloy thereof onto the laminated body 203 by a dry process such as vacuum deposition or sputtering. The laminated capacitor 200 is manufactured accordingly. The method for forming the external electrodes 204 by the dry process is similar to that described with reference to the first embodiment.

The laminated capacitor 200 which is manufactured by this method has the intermediate layers 205 formed between the laminated body 203 and the external electrodes 204 as described above. Accordingly, the intermediate layers 205 moderate stresses between the external electrodes 204 and the laminated body 203, thereby preventing the laminated body 203 from being cracked or delaminated when the laminated capacitor 200 is soldered to a circuit board.

Further, the intermediate layers 205 fill up the depressions on the end surfaces of the laminated body 203 formed due to shrinkage of the internal electrode outlet portions 201a, and prevent end surfaces of the external electrodes 204 from being cracked even when the external electrodes 204 are formed by the dry process since the joined surfaces between the external electrodes 204 and the intermediate layers 205 are flat.

Therefore, the present invention makes it possible to obtain the laminated capacitor 200 which has high adhesion property between the external electrodes 204, the laminated body 203 and the internal electrodes 201, and is excellent in water resistance, reliability and durability.

Though the intermediate layers 205 are formed by applying the suspension 206 in which ultrafine metal powder are dispersed in the second embodiment, the intermediate layers 205 may be formed by applying an organic metallic resinate and drying it. Further, the intermediate layers 205 may be formed by applying an electrically conductive paste which consists of ultrafine metal particles or an organic metallic resin, a binder and a vehicle and drying the paste. For example, benzyl silicate, zirconium naphthenate or the like is used as the organic metallic resin.

Further, it is possible for embodying the present invention to form the intermediate layers 205 by coating a metal having a low fusion point and irradiate coated locations with laser beams so as to fuse and harden the metal having the low fusion point. A metal having a fusion point is a metal having a fusion point not exceeding approximately 400° C. for example, Sn, In, Sn—In alloy, Sn—Ag alloy or In—Ag alloy.

Furthermore, the intermediate layers 205 which are thin metal films may be formed by depositing a metal such as Au onto the end surfaces of the laminated body 203 by the dry process such as the vacuum deposition or sputtering.

Moreover, the intermediate layers 205 may be used only for filling up the depressions formed on the end surfaces of the laminated body 203, and not be formed between the laminated body 203 and the external electrodes 204. In such a case, however, the intermediate layers 205 do not exhibit the effect to prevent the laminated body 203 from being cracked by moderating stresses between the external electrodes 204 and the laminated body 203 though the layers enhance the adhesion property by filling up the depressions.

Figure 16:
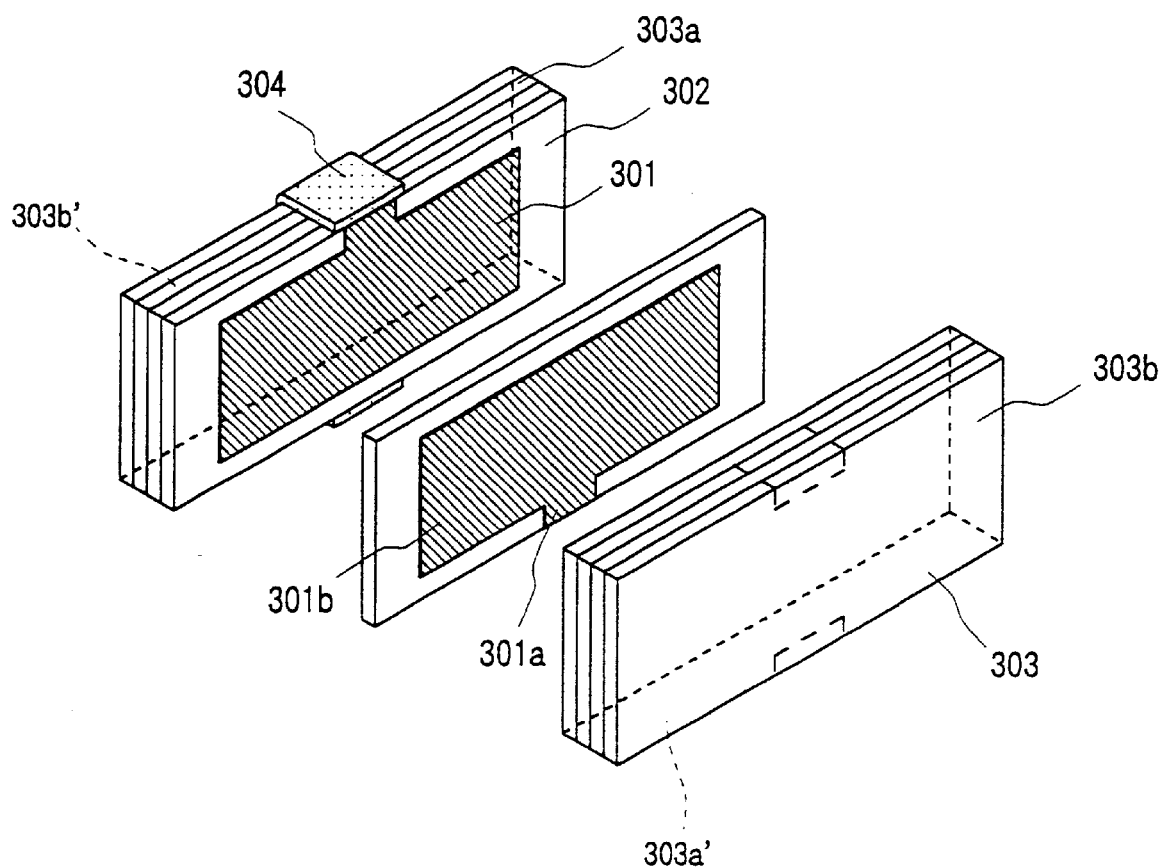
FIG. 16 is a perspective view illustrating a configuration of a laminated capacitor preferred as still another embodiment of the present invention in its disassembled condition.

Now, a third embodiment of the present invention will be described with reference to FIG. 16. In the third embodiment, description will be made of a laminated capacitor, which is an example of laminated electronic part. FIG. 16 is a perspective view illustrating a configuration of the laminated capacitor in its disassembled condition.

In FIG. 16, a reference numeral 300 represents a laminated capacitor which is an example of laminated electronic part including a laminated body 303 composed of alternately laminated internal electrodes 301 and insulator layers 302, and a pair of external electrodes 304 which are attached to the laminated body 303.

The internal electrode 301 is a thin metal film which is formed by sintering a thin film of an electrically conductive paste. Its material has a main component of a metal having a low fusion point which is, for example Ag—Pd or Ag having a fusion point of approximately 1050° C. or less. The internal electrode 301 includes an internal electrode outlet portion 301a and an internal electrode piece 301b which is connected to a base of the internal electrode outlet portion 301a. An end of the internal electrode outlet portion 301a is connected to the external electrode 304.

The insulator layer 302 is composed of a rectangular sheet-like ceramic sinter. This ceramic sinter is made of a dielectric material which is prepared by sintering a green sheet having a main component, for example, of barium titanate.

The external electrode 304 is a thin metal film formed by a dry process which is typically represented by the vacuum deposition and sputtering. A main component of a material selected for the external electrode 304 is a metal which has a fusion point higher than that of the internal electrode 301. The main component is, for example, Ni which has a fusion point of approximately 1450° C. The external electrode 304 is formed at a predetermined width from a side surface 303a of the laminated body 303 to side surfaces 303b and 303b' adjacent to the side surface 303a. Similarly, the external electrode 304 is formed from a side surface 303a' opposite to the side surface 303a to the side surfaces 303b and 303b'. Further, the external electrodes 304 are conductively connected to the internal electrode outlet portions 301a of the internal electrodes 301.

A method of manufacturing laminated capacitor 300, which is an example of a laminated electronic part, is now described. First, an electrically conductive paste containing a main component of Ag—Pd or Ag which has a fusion point not exceeding approximately 1050° C. is printed as patterns of internal electrodes onto green sheets. Then, the green sheets are laminated in a plurality as in the first embodiment, a laminated body thus formed is bonded by applying a pressure of approximately 40 tons in a direction of its thickness at approximately 50° C. and a laminated chip having a nearly rectangular parallelepiped form is obtained by cutting the laminated body in a lattice-like form.

Then, the laminated chip is heated to approximately 300° C. in atmosphere for de-binder treatment or vaporizing an organic binder contained in the green sheets and calcined at approximately 90° C., thereby obtaining a laminated body which has a nearly rectangular parallelepiped form.

Then, the external electrodes 304 composed of thin metal film are formed by depositing a metal material having a fusion point higher than that of the internal electrodes onto the laminated body by a dry process. The metal material is, for example, a metal such as Ni, which has a fusion point of approximately 1450° C. Materials and structures of masks which are to be used for the dry process are similar to those of the masks used in the first embodiment.

This manufacturing method of a laminated electronic part allows metal particles at high temperature to collide and deposit against and onto surfaces of the laminated body at the stage to form the external electrodes by the dry process, thereby decomposing oxide films which are formed on surfaces of the internal electrode outlet portions due to a fusing or reducing function of the internal electrode outlet portions. Accordingly, the laminated electronic part manufactured by this method is free from influences due to the oxide films, and is excellent in an adhesion property and electrical conductivity between the external electrodes and the internal electrodes.

Figure 17:
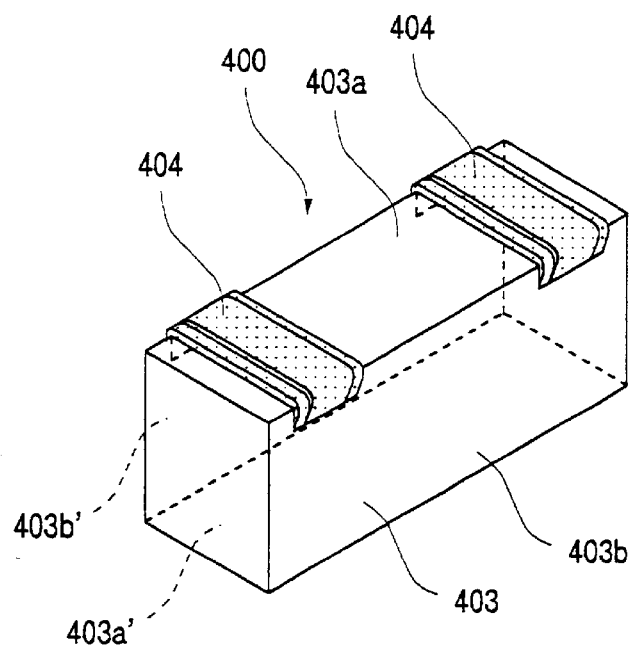
FIG. 17 is a perspective view illustrating a laminated capacitor preferred as further another embodiment of the present invention.

Now, a fourth embodiment of the present invention will be described with reference to FIGS. 17 and 18. In the fourth embodiment, description will be made of a laminated capacitor which is an example of laminated electronic part. FIG. 17 is a perspective view of the laminated capacitor and FIG. 18 is a perspective view illustrating a configuration of the laminated capacitor in its disassembled condition.

Figure 18:
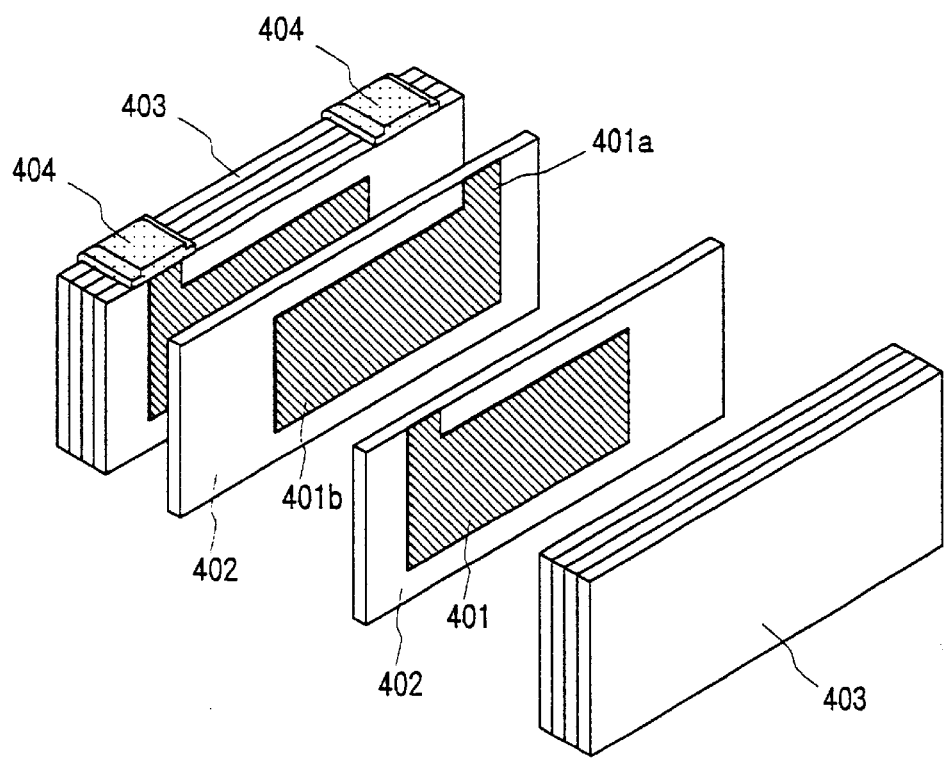
FIG. 18 is a perspective view illustrating a configuration of a laminated capacitor preferred as still further another embodiment of the present invention in its disassembled condition.

In FIG. 18, a reference numeral 400 represents a laminated capacitor which is an example of laminated electronic part including a laminated body 403 formed by alternately laminating internal electrodes 401 and insulator layers 402, and a pair of external electrodes 404 which are attached to the laminated body 403.

The internal electrode 401 is a thin metal film which is formed by sintering a thin film of an electrically conductive paste. Its material has a main component, for example, of Ag, Pd or Ag—Pd. Further, the internal electrode 401 consists of an internal electrode outlet portion 401a and an internal electrode piece 401b which is connected to a base of the internal electrode outlet portion 401a. An end of the internal electrode outlet portion 401a is connected to the external electrode 404.

The insulator layer 402 is composed of a rectangular sheet-like ceramic sinter. This ceramic sinter is made of a dielectric material which is prepared by firing green sheets having a main component, for example, of barium titanate.

The external electrode 404 is a thin metal film made of a metal such as Ni, Ag, Sn, Cr, Al, Cu or an alloy thereof. The external electrode 404 is formed by a dry process which is typically represented by the vacuum deposition and sputtering. The pair of external electrodes 404 is formed at a predetermined width from a side surface 403a of the laminated body 403 to side surfaces 403b and 403b' adjacent to the side surface 403a. On the side surface 403a, the external electrode 404 is formed so as to be uniform in thickness in a direction of length thereof but has a center which is thicker than edge portions in a direction of width thereof. The external electrode 404 is disposed so that the thicker portion is conductively connected to the internal electrode outlet portion 461a.

Figure 19:
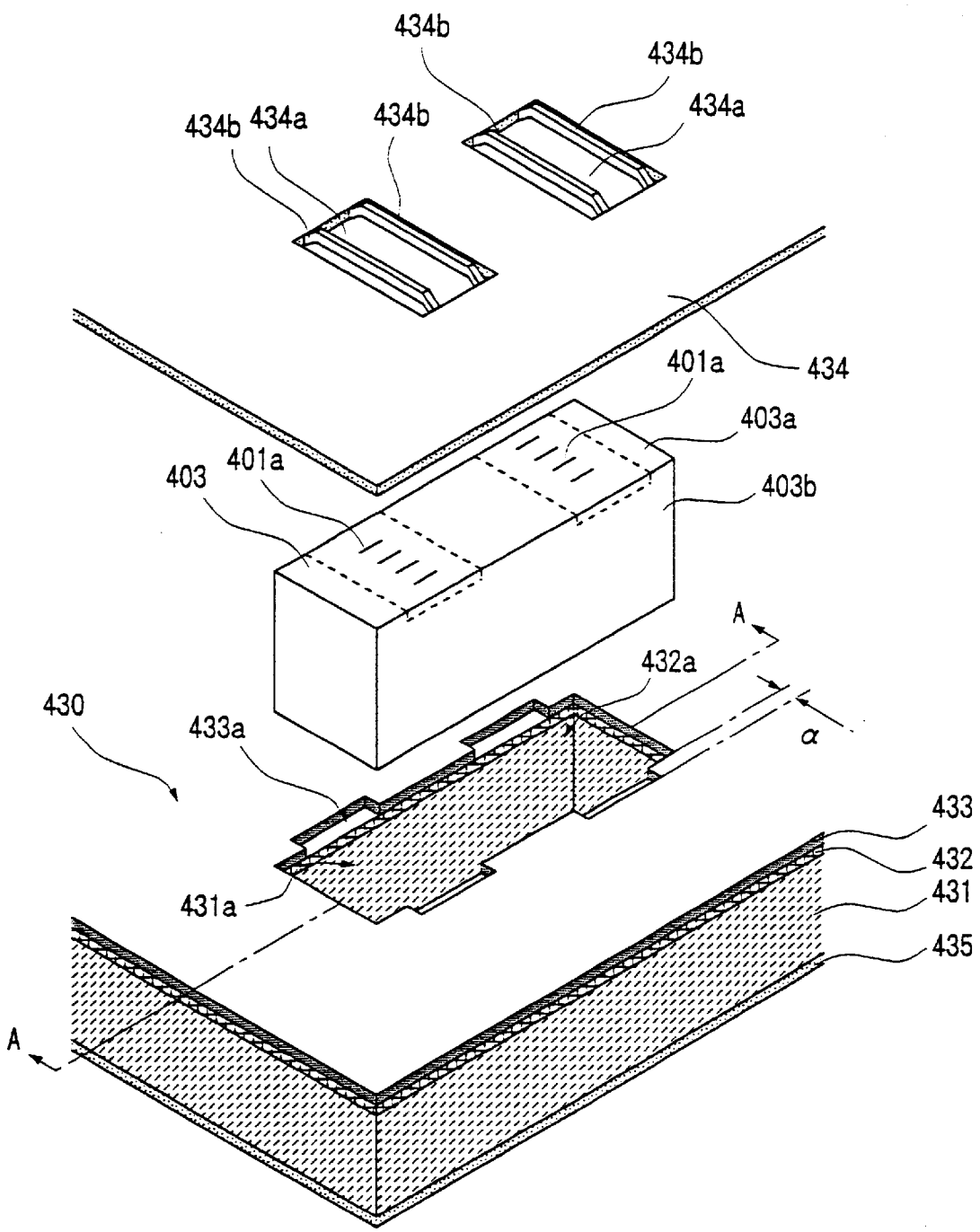
FIG. 19 is a perspective view illustrating a configuration of a film forming jig in its disassembled condition.
Figure 20:
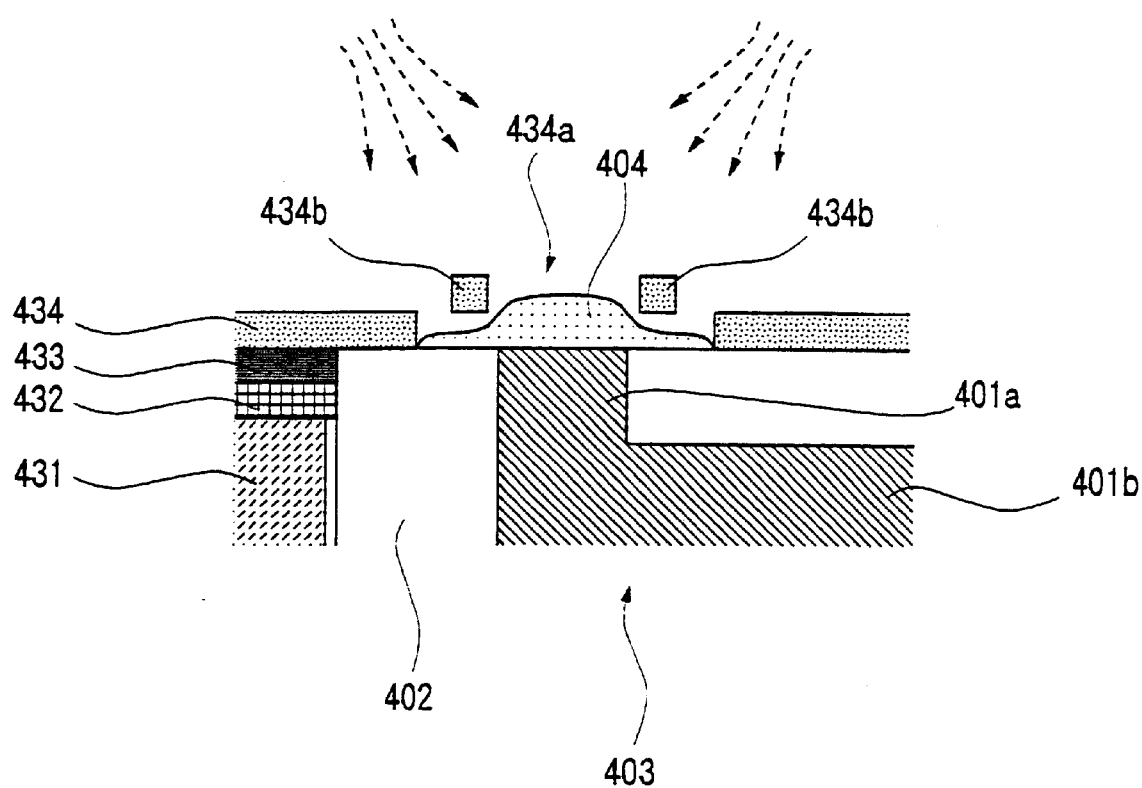
FIG. 20 is a sectional view taken in a direction indicated by arrows A in FIG. 19 descriptive of formation of an external electrode.
Figure 21:
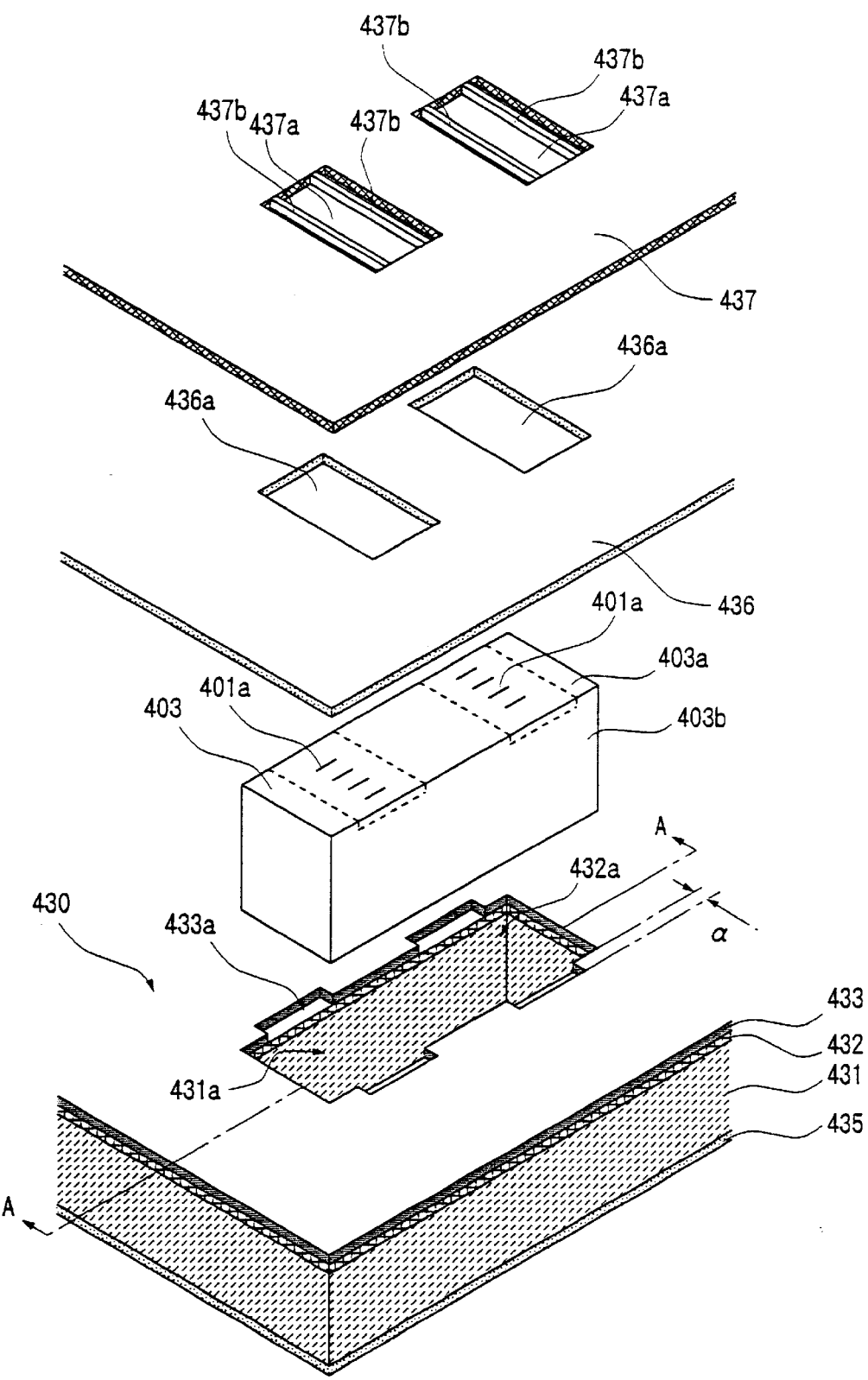
FIG. 21 is a perspective view illustrating a configuration of another film forming jig in its disassembled condition.
Figure 22:
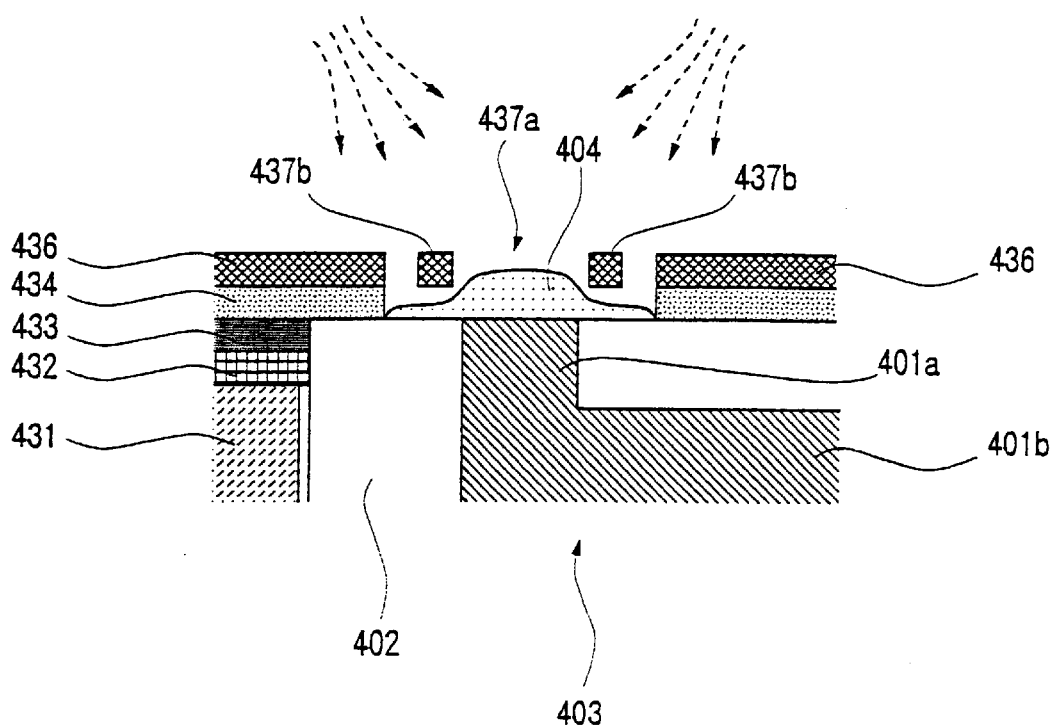
FIG. 22 is a sectional view taken in a direction indicated by arrows A in FIG. 21 descriptive of formation of an external electrode.

Then, description will be made of a manufacturing method of the laminated capacitor 400 which is selected as an example of laminated electronic part with reference to FIGS. 19 through 22. FIG. 19 is a perspective view illustrating a configuration of a film forming jig in its disassembled condition, FIG. 20 is a sectional view taken in a direction indicated by arrows A in FIG. 19 for description of formation of external electrodes, FIG. 21 is a perspective view illustrating a configuration of another film forming jig in its disassembled condition and FIG. 22 is a sectional view taken in a direction indicated by arrows A in FIG. 20 for description of formation of external electrodes.

First, a de-binder treatment is carried out and a fired laminated body 403 is manufactured. Manufacturing steps to this stage are similar to those in the first embodiment and will not be described in particular.

Then, a pair of external electrodes 404 is formed on the laminated body 403 by a dry process which is typically represented by the vacuum deposition and sputtering. The external electrode 404 is a thin metal film made of Ni, Ag, Sn, Cr, Al, Cu or an alloy thereof.

For forming the external electrodes 404 by the vacuum deposition, for example, the laminated body 403 is mounted on a film forming jig 430 and the film forming jig 430 is set in a film forming apparatus such as a vacuum chamber. In the film forming apparatus, the metal is heated to a high temperature and vaporized, whereby its particles are deposited onto the laminated body 403 which is exposed from the film forming jig 430. The external electrodes 404 composed of the thin metal films are formed on the laminated body 403 accordingly.

The film forming jig 430 is composed of a holding cage 431, masks 432 through 434 and a holding plate 435. The film forming jig 430 is formed by stacking these members in a direction of its thickness, or laminating the masks 432, 433 and 434 in this order on the holding cage 431, and the holding plate 435 is disposed under the holding cage 431. Apertures are formed in the holding cage 431 and the masks 432 through 434 so that the laminated body 403 can be accommodated in the film forming jig 430.

An aperture 431a which has a width and a length slightly larger than those of a side surface 403a of the laminated body 403 is formed in the holding cage 431.

An aperture 432a which has a width and a length slightly smaller than those of the aperture 431a of the cage 431 is formed in the mask 432 which is adjacent to the holding cage 431.

An aperture 433a which corresponds to the aperture 432a of the mask 432 is formed in the mask 433 which is adjacent to the mask 432. Centers on both sides of the aperture 433a protrudes for a length of α in a direction of width of the side surface 403a, whereby the aperture 433a has a nearly cross shape. The pair of protruding portions has a width which is the same as that of external electrodes 404 which are to be formed on the side surface 403a of the laminated body 403.

The mask 434 which is adjacent to the mask 433 and disposed on the outermost side of the film forming jig 430 has a pair of apertures 434a which have ends corresponding to the protruding portions of the aperture 433a of the mask 433 and are open over the aperture 433a. Further, a pair of film formation retarder members 434b is bridged across the apertures 434a in a longitudinal direction thereof in the mask 434. The film formation retarder members 434b are nearly bar-shaped and disposed in parallel with longer sides of the apertures 434a. Further, the film formation retarder members 434b are disposed so as to be along steps which are to be formed by film thickness of the external electrode 404. Furthermore, the film formation retarder members 434b are arranged so that a region of the aperture 434a which is sandwiched by the pair of film formation retarder members 434b has an area larger than that of the rest region of the aperture 434a. Moreover, the film formation retarder members 434b are spaced from the surface of the mask 434 for a predetermined distance outward, i.e., in a direction away from the holding cage 431 and have ends attached to edges of the aperture 434a. The film formation retarder members 434b are spaced as described above so that clearances are formed over the laminated body 403, whereby metal particles diffuse across the film formation retarder members 434b and form the external electrode 404 even under the film formation retarder members 434b.

Thicknesses of these members are set so that a thickness obtained by overlapping the masks 432, 433 and the holding cage 431 is equal to a height of the side surface 403b of the laminated body 403. Locations of the side surface of the laminated body 403 at which the external electrodes 404 are to be formed are exposed when the masks 432, 433 and the holding cage 431 are overlapped, the laminated body 403 is set in the apertures formed in these members, and the mask 434 is further overlapped. In this condition, the film formation retarder members 434b are disposed so as to be along the steps which are to be formed by film thickness of the external electrodes 404 and at a predetermined distance from the laminated body 403. It is preferable to set thickness of mask 434, for example, as the predetermined distance between the laminated body 403 and the film formation retarder members 434b.

Though it is general to select a metal such as stainless steel, tungsten or molybdenum as a material for the film forming jig 430, it is desirable to use a ceramic material which has a small thermal expansion coefficient considering a fact that maintenance of precision is made difficult due to thermal expansion caused by a high temperatures at the stage of irradiation with particles of a film forming material.

When the external electrodes 404 are formed by the dry process with the laminated body 403 set on the film forming jig 430 described above, at least the locations of the external electrodes 404 which are to cover the internal electrode outlet portions 401a are coated with a larger number of the metal particles and have a larger film thickness than other locations owing to the film formation retarder members 434b disposed in the mask 434 as shown in FIG. 20. Accordingly, the external electrodes 404 can fill up and cover depressions even when the depressions are formed on the side surface of the laminated body 403 due to shrinkage of the internal electrode outlet portions 401a into the laminated body 403. Therefore, the laminated capacitor 400 does not allow its side surface to be cracked, and is excellent in its adhesion property and so on. Further, the laminated capacitor 400 is capable of preventing the external electrodes from being cracked or delaminated due to stresses more effectively than a laminated capacitor which has external electrodes having a uniform film thickness.

Usable in place of the mask 434 are masks 436 and 437 which are shown in FIGS. 21 and 22. The mask 436 has an aperture 436a, and is the same as the mask 434 from which the film formation retarder members 434b are removed. The mask 437 has a pair of apertures 437a and film formation retarder members 437b which are disposed in the apertures 437a, and is the same as the mask 434 in which the film formation retarder members 434b are disposed on a plane. The masks 436 and 437 which are overlapped are usable in place of the mask 434.

Figure 23:
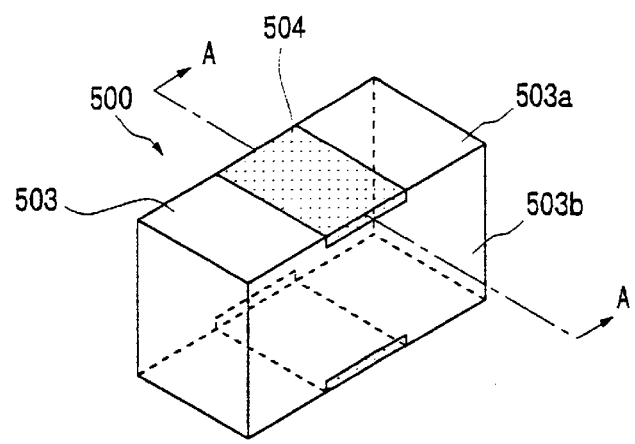
FIG. 23 is a perspective view of a laminated capacitor preferred as still another embodiment of the present invention.
Figure 24:
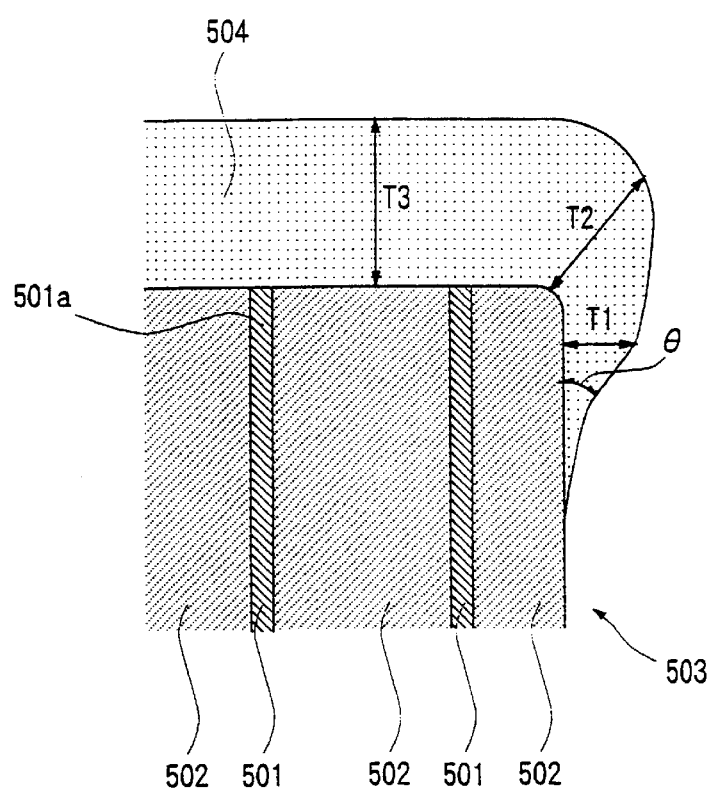
FIG. 24 is a sectional view taken in a direction indicated by arrow A in FIG. 23.

Now, a fifth embodiment of the present invention will be described with reference to FIGS. 23 and 24. A laminated capacitor will be described as an example of chip-like electronic part in the fifth embodiment. FIG. 23 is a perspective view of the laminated capacitor and FIG. 24 is a sectional view taken in a direction indicated by arrows A in FIG. 23.

In FIG. 23, a reference numeral. 500 represents a laminated capacitor consisting of a unit element 503 which is formed by alternately laminating and then sintering internal electrodes 501 and insulator layers 502, and a pair of external electrodes 504 which are formed on side surfaces of the unit element 503.

The internal electrode 501 disposed in the unit element 503 is a thin metal film which is formed by firing an electrically conductive paste having a main component such as Pd, Ag or a Pd—Ag alloy. The insulator layer 502 is a ceramic sinter which is formed by firing green sheets. The internal electrode 501 has an end 501a which is exposed on a side surface 503a of the unit element 503. The end 501a is conductively connected to the external electrode 504. The unit element 503 is formed by laminating the internal electrodes 501 and the insulator layers 502. The unit element 503 has a nearly rectangular parallelopiped form whose angles are rounded by barrel polishing or the like.

The external electrode 504 is formed on a region ranging from the side surface 503a of the unit element 503 to a pair of side surfaces 503b adjacent to the side surface 503a. The external electrode 504 is formed at a predetermined width so as to cover the ends 501a of the internal electrodes 501 and conductively connected thereto. The external electrode 504 has film thickness which is varied from location to location as shown in FIG. 24.

Speaking concretely, film thickness T3 on the side surface 503a on which the ends 501a are exposed, film thickness T2 on an edge at which the side surface 503a adjoins to the side surface 503b and film thickness T1 on the side surface 503b are set in relationship of T1<T2<T3. Further, the film thickness T1 on the side surface 503b is gradually reduced toward ends of the film. The external electrode 504 has a surface whose end intersects with the side surface 503b at an angle θ which is not larger than a predetermined angle.

Since the external electrode 504 is liable to peel off the unit element 503 when the angle θ is large, it is desirable that the angle θ is no larger than 40 degrees, or more desirably no larger than 20 degrees.

The laminated capacitor 500 is capable of maintaining a high joining property and electrical conductivity between the internal electrodes 501 and the external electrodes 504 owing to the fact that the external electrodes 504 have the film thickness which is larger on the side surface 503a than that on the side surface 503b. Owing to the fact that the external electrodes 504 have film thickness which is smaller on the side surface 503b than that on the side surface 503a, on the other hand, the laminated capacitor 500 is capable of reducing stresses applied to the unit element 503, thereby preventing it from being cracked at a stage to solder the laminated capacitor 500 to a circuit board. Further, the laminated capacitor 500 is capable of preventing the external electrodes 504 from peeling off the unit element 503 owing to the fact that the external electrodes 504 are formed on the side surfaces 503b so as to have film thickness which is reduced toward the ends thereof. Accordingly, the laminated capacitor 500 is excellent in electrical conductivity between the external electrodes 504 and the internal electrodes 501, durability against thermal shocks, precision and reliability.

Figure 25:
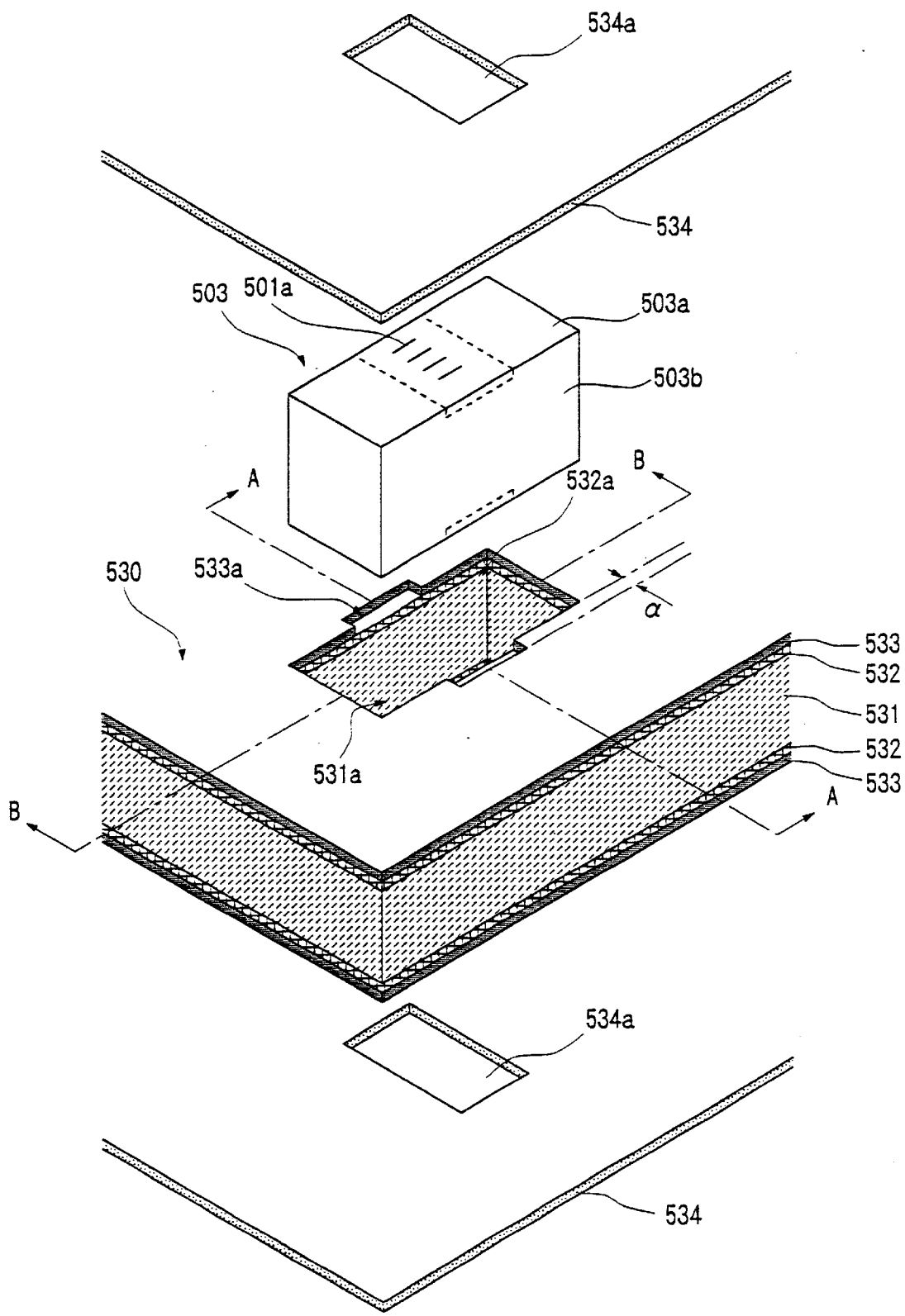
FIG. 25 is a perspective view illustrating a configuration of a film forming jig in its disassembled condition.
Figure 26:
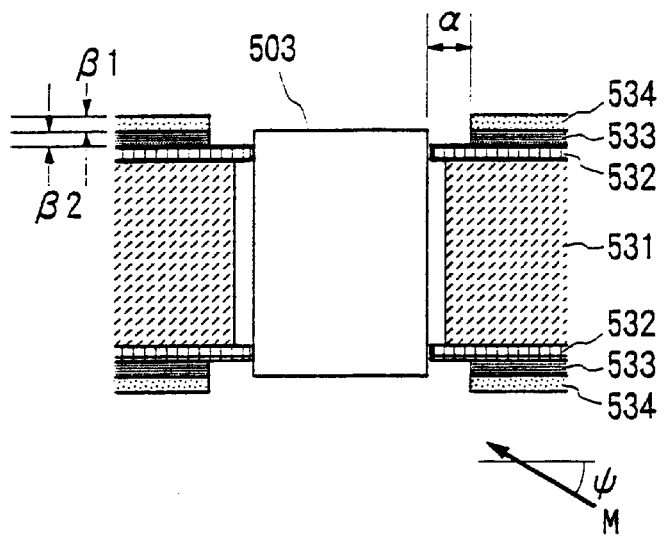
FIG. 26 is a sectional view taken in a direction indicated by arrows A in FIG. 25 for illustrating an external electrode formation method.
Figure 27:
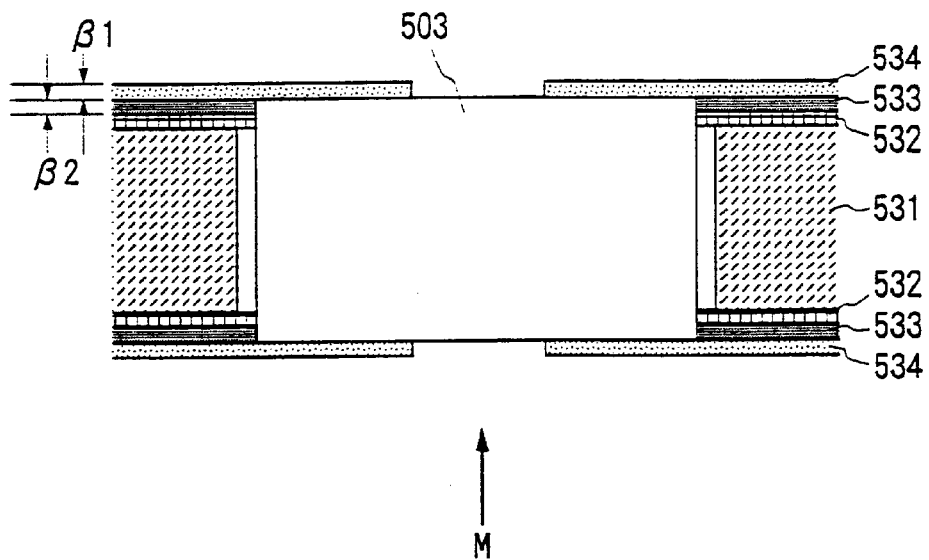
FIG. 27 is a sectional view taken in a direction indicated by arrows B in FIG. 25 for illustrating the film formation method.
Figure 28:
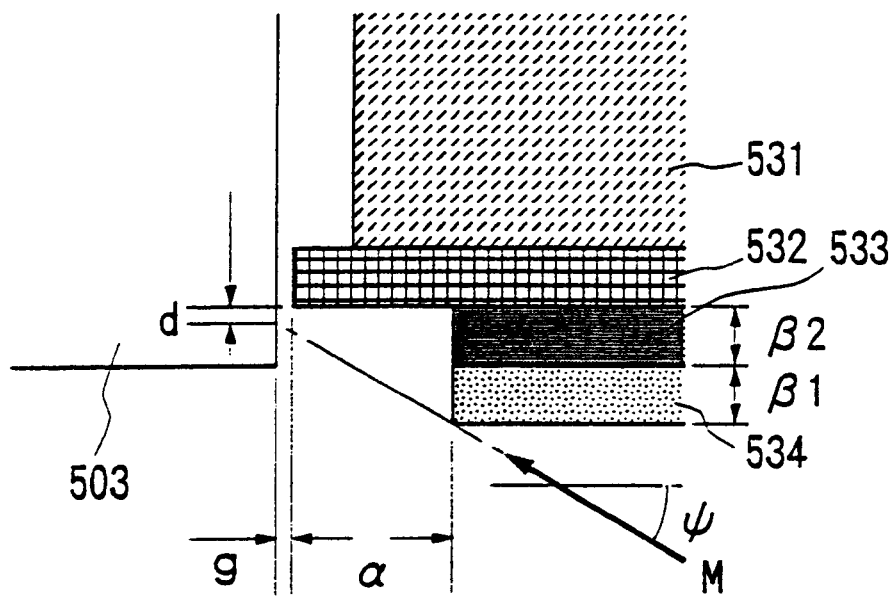
FIG. 28 is a diagram showing a portion of FIG. 27 on an enlarged scale for illustrating the external electrode formation method.

Then, a manufacturing method of the laminated capacitor 500 will be described with reference to FIGS. 25 through 28. FIG. 25 is a perspective view illustrating the film forming jig 530 in its disassembled condition for description of its configuration, FIG. 26 is a sectional view taken in a direction indicated by arrows A in FIG. 25, FIG. 27 is a sectional view taken in a direction indicated by arrows .B in FIG. 25 and FIG. 28 is an enlarged view illustrating a portion of FIG. 27 on an enlarged scale.

First, an electrically conductive paste having a main component of Ag, Pd or Ag—Pd is printed onto green sheets and dried. The electrically conductive paste is printed in a pattern of the internal electrodes 501. Then, a plurality of the green sheets are laminated. Further, a laminated body thus obtained is bonded by applying a pressure of approximately 40 tons in a direction of thickness thereof at a temperature of approximately 50° C. Thereafter, a laminated chip which has a nearly rectangular parallelopiped form is obtained by cutting the laminated body into a lattice form.

Then, the laminated chip is heated to approximately 300° C. in atmosphere. This heat treatment is a de-binder treatment for vaporizing an organic binder contained in the green sheets. Thereafter, edges of the laminated chip are rounded by barrel polishing. Then the unit element 503 which is a laminated body having a nearly rectangular parallelopiped form is obtained by firing the laminated chip at approximately 1300° C.

Then, a pair of external electrodes 504 is formed by depositing a metal material onto the unit element 503 by a dry process which is typically represented by the vacuum deposition and sputtering. The metal material is Ni, Ag, Sn, Cr, Al, Cu or an alloy thereof.

For forming the external electrode 504 by the vacuum deposition, for example, the unit element 503 is mounted on the film forming jig 530 and the film forming jig 530 is set in a film forming apparatus such as a vacuum chamber. In the film forming apparatus, the metal is heated to a high temperature and vaporized, whereby its particles are deposited onto the unit element 503 which is exposed from the film forming jig 530. The external electrodes 504 which are composed of thin metal films are formed on the unit element 503 accordingly.

The film forming jig 530 used for forming the external electrodes 504 will be described with reference to FIGS. 25 through 28. The film forming jig 530 is composed of a holding cage 531 and masks 532 through 534. The film forming jig 530 is composed by stacking the members in a direction of thickness, and laminating the masks 532, 533 and 534 over and under the holding cage 531. An aperture is formed in each member so that the unit element 503 can be mounted in the film forming jig 530.

An aperture 531a which has a width and a length slightly larger than those of the side surface 503a of the unit 503 element 503 is formed in the holding cage 531.

An aperture 532a which has a width and a length slightly smaller than those of the aperture 531a of the holding cage 531 is formed in the mask 532 adjacent to the holding cage 531.

An aperture 533a which corresponds to the aperture 532a of the mask 532 is formed in the mask 533 adjacent to the mask 532. The aperture 533a protrudes, at centers of both sides thereof, for a length α in a width direction-of the side surface 503a and has a nearly cross shape. This pair of protruding portions has a width equal to that of the external electrodes 504 which are to be formed on the side surfaces 503a of the unit element 503.

The mask 534 which is adjacent to the mask 533 and disposed on an outermost side of the film forming jig 530 has an aperture 534a which has ends corresponding to the protruding portions of the aperture 533a of the mask 533 and is open over the pair of protruding portions of the aperture 533a.

Thicknesses of these members are set so that a thickness obtained by overlapping the masks 532, 533 and the cage 531 is equal to a height of the side surface 503b of the unit element 503. Further, a thickness β2 of the mask 533 is set so as to be nearly equal to a height of the external electrode 504 to be formed on the side surface 503b of the unit element 503.

This film forming jig 530 exposes only locations of the side surface of the unit element 503 at which the external electrodes 504 are to be formed when the masks 532, 533 and the holding tool 531 are overlapped, the unit element 503 is set in the apertures formed therein and the mask 534 is further overlapped.

Though it is general to use a metal such as stainless steel, tungsten or molybdenum as a material for the film forming jig 530, it is desirable to adopt a ceramic material having a small expansion coefficient considering the fact that maintenance of precision is made difficult due to thermal expansion caused by a high temperature at a stage of irradiation with particles of a film forming material.

For forming the external electrodes 504 on the unit element 503 with the film forming jig 530, the unit element 503 is first set in the aperture of the film forming jig 530. Then, the film forming jig 530 is set in a film forming apparatus such as a vacuum chamber. The film forming jig 530 is set so that an emission source of particles of a film forming material M which is a metal material is located in a longitudinal direction of the aperture 534a of the mask 534 and obliquely sideward the unit element 503. Then, particles of the film forming material M are emitted from the emission source and deposited on the side surface of the unit element 503 which is exposed from the film forming jig 530. Finally, the film forming jig 530 is taken out of the film forming apparatus and the unit element 503 is taken as the laminated capacitor 500 out of the film forming jig 530.

For irradiating the film forming jig 530 with the particles of the film forming material M, an angle of incidence φ on the side surface 503a of the unit element 503, thickness β1 of the mask 534, thickness β2 of the mask 533 and the length α of the protruding portions of these masks are set as described below. When a straight line having an angle of incidence φ is traced from an end of the mask 534 to the side surface 503b of the unit element 503, an intersection between this straight line and the side surface 503b is located at a point which is nearer the side surface 503a for a distance d than an end of the external electrode 504 to be formed. Accordingly, a region of the side surface 503b which is located toward a center thereof from this intersection is optically shadowed from the emission source of the particles of the film forming material M. At the deposition stage, however, the particles of the film forming material M diffuse across the edge of the mask 534 and deposit onto this shadowed region in an amount smaller than that of particles which deposit directly, whereby the external electrode 504 is formed on the side surface 503b so as to have film thickness gradually reduced from a region which is not shadowed to the shadowed region and thinnest at an end of the shadowed region. It is adequate to set the angle of incidence φ at 30 to 60 degrees from a view point of a gap g to be reserved between the side surface 503b of the unit element 503 and the mask 532.

This manufacturing method of the chip-like electronic part adjusts the height d to be shadowed on the side surface 503b of the unit element 503 by adequately adjusting the angle of incidence φ, the protruding lengths α of the apertures 533a and 534a of the masks 533 and 534, the thickness β2 of the mask 533, and the thickness β1 of the mask 534. Accordingly, this method adjusts a deposition speed of the particles of the film forming material on the side surface 503b of the unit element 503. Therefore, this method makes it possible to form the external electrode 504 on the side surface 503b so as to have film thickness which is larger than that on the side surface 503a and reduced toward the end of the side surface 503b.

Though the laminated capacitors have been described above as examples of electronic parts, it is needless to say that the present invention is applicable not only to laminated capacitors but also widely to other electronic parts. The present invention is applicable, for example, to laminated inductors, laminated LC filters and array-type composite parts.

What is claimed is:

1. An electronic part comprising:

a laminated body comprising electrically conductive internal electrode layers and ceramic insulator layers; and external electrodes including of thin films which are formed by a dry process at predetermined locations of surfaces of said laminated body including locations where said internal electrode layers are exposed and which are conductively connected to said internal electrode layers, wherein at least said predetermined locations of the surfaces of said laminated body have predetermined surface roughness resulting from polishing of said predetermined locations of the surfaces of said laminated body prior to the thin films being formed.

2. An electronic part according to claim 1, wherein a protruding height of said internal electrode layers from the surfaces of said laminated body does not exceed a predetermined value.

3. An electronic part according to claim 2, wherein said predetermined value is 0.5 μm.

4. An electronic part according to claim 1, wherein a depression depth of said internal electrodes from the surfaces of said laminated body does not exceed a predetermined value.

5. An electronic part according to claim 1, wherein said predetermined surface roughness does not exceed 0.1 μm in an arithmetical mean.

6. The electronic part of claim 1 wherein said external electrodes are made of a material which has a fusion point higher than that of said internal electrode layers.

7. The electronic part of claim 1 wherein said external electrodes have film thickness thicker than that of other locations at the locations where said internal electrode layers are exposed.

8. The electronic part of claim 1 wherein:

the body has a nearly rectangular parallelepiped form;

the external electrodes are formed at predetermined locations ranging from a first surface where said internal electrode layers are exposed to second surfaces adjacent to said first surface, said external electrodes having film thickness which increases from ends of said external electrodes on said second surfaces toward said first surface, and a surface of the end of said external electrodes on said second surface intersects said second surface at an angle not larger than a predetermined angle.

9. An electronic part according to claim 8, wherein said predetermined angle is 40°.

10. An electronic part comprising:

a laminated body comprising electrically conductive internal electrode layers fired with ceramic insulator layers; and external electrodes including thin films which are formed by a dry process at predetermined locations of surfaces of said laminated body including locations where said internal electrodes are exposed and which are conductively connected to said internal electrodes, wherein at least said predetermined locations of the surfaces of said laminated body are polished prior to the thin films being formed by the dry process.

11. The electronic part of claim 10 wherein said external electrodes are made of a material which has a fusion point higher than that of said internal electrodes.

12. The electronic part of claim 10 wherein said external electrodes are formed so as to have film thickness thicker than that of other locations at the locations where said internal electrodes are exposed.

* * * * *